United States Patent
Saleh et al.

(10) Patent No.: US 12,159,341 B2
(45) Date of Patent: Dec. 3, 2024

(54) COMMON CIRCUITRY FOR TRIANGLE INTERSECTION AND INSTANCE TRANSFORMATION FOR RAY TRACING

(71) Applicant: Advanced Micro Devices, Inc., Santa Clara, CA (US)

(72) Inventors: Skyler Jonathon Saleh, San Diego, CA (US); Fataneh F. Ghodrat, Boxborough, MA (US); Jeffrey Christopher Allan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/564,103

(22) Filed: Dec. 28, 2021

(65) Prior Publication Data
US 2023/0206541 A1 Jun. 29, 2023

(51) Int. Cl.
*G06T 15/06* (2011.01)
*G06T 1/20* (2006.01)
*G06T 15/08* (2011.01)
*G06T 17/10* (2006.01)

(52) U.S. Cl.
CPC ............. *G06T 15/06* (2013.01); *G06T 1/20* (2013.01); *G06T 15/08* (2013.01); *G06T 17/10* (2013.01); *G06T 2210/21* (2013.01)

(58) Field of Classification Search
CPC ........... G06T 15/06; G06T 15/08; G06T 1/20; G06T 17/10; G06T 2210/21
See application file for complete search history.

(56) References Cited

U.S. PATENT DOCUMENTS

| 10,198,851 | B2 | 2/2019 | Lee et al. | |
| 10,373,367 | B2 | 8/2019 | Kim et al. | |
| 2018/0182158 | A1* | 6/2018 | Karras | G06T 15/06 |
| 2020/0051315 | A1* | 2/2020 | Laine | G06T 15/06 |
| 2020/0193682 | A1 | 6/2020 | Saleh | |
| 2020/0193685 | A1* | 6/2020 | Saleh | G06T 15/80 |
| 2020/0211265 | A1 | 7/2020 | Brownlee et al. | |
| 2021/0287423 | A1* | 9/2021 | Guenther | G06T 1/20 |
| 2021/0390758 | A1* | 12/2021 | Muthler | G06T 15/08 |
| 2022/0020201 | A1* | 1/2022 | Fenney | G06T 15/06 |
| 2022/0207690 | A1* | 6/2022 | Burns | G06T 1/20 |

OTHER PUBLICATIONS

Woop, S., et al., "Watertight Ray/Triangle Intersection", Journal of Computer Graphics Techniques, vol. 2, No. 1, 18 pgs., 2013.
Meister, D., et al., "A Survey on Bounding Volume Hierarchies for Ray Tracing", Computer Graphics Forum, vol. 40, No. 2, Jun. 2021, 30 pgs.

* cited by examiner

*Primary Examiner* — Sing-Wai Wu
*Assistant Examiner* — Khoa Vu
(74) *Attorney, Agent, or Firm* — Volpe Koenig

(57) ABSTRACT

A technique for performing ray tracing operations is provided. The technique includes traversing through a bounding volume hierarchy to an instance node; performing an instance node transform using common circuitry; traversing to a leaf node of the bounding volume hierarchy; and performing an intersection test for the leaf node using the common circuitry.

20 Claims, 7 Drawing Sheets

US 12,159,341 B2

COMMON CIRCUITRY FOR TRIANGLE INTERSECTION AND INSTANCE TRANSFORMATION FOR RAY TRACING

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes traversing through a bounding volume hierarchy to an instance node; performing an instance node transform using common circuitry; traversing to a leaf node of the bounding volume hierarchy; and performing an intersection test for the leaf node using the common circuitry.

Figure 1:
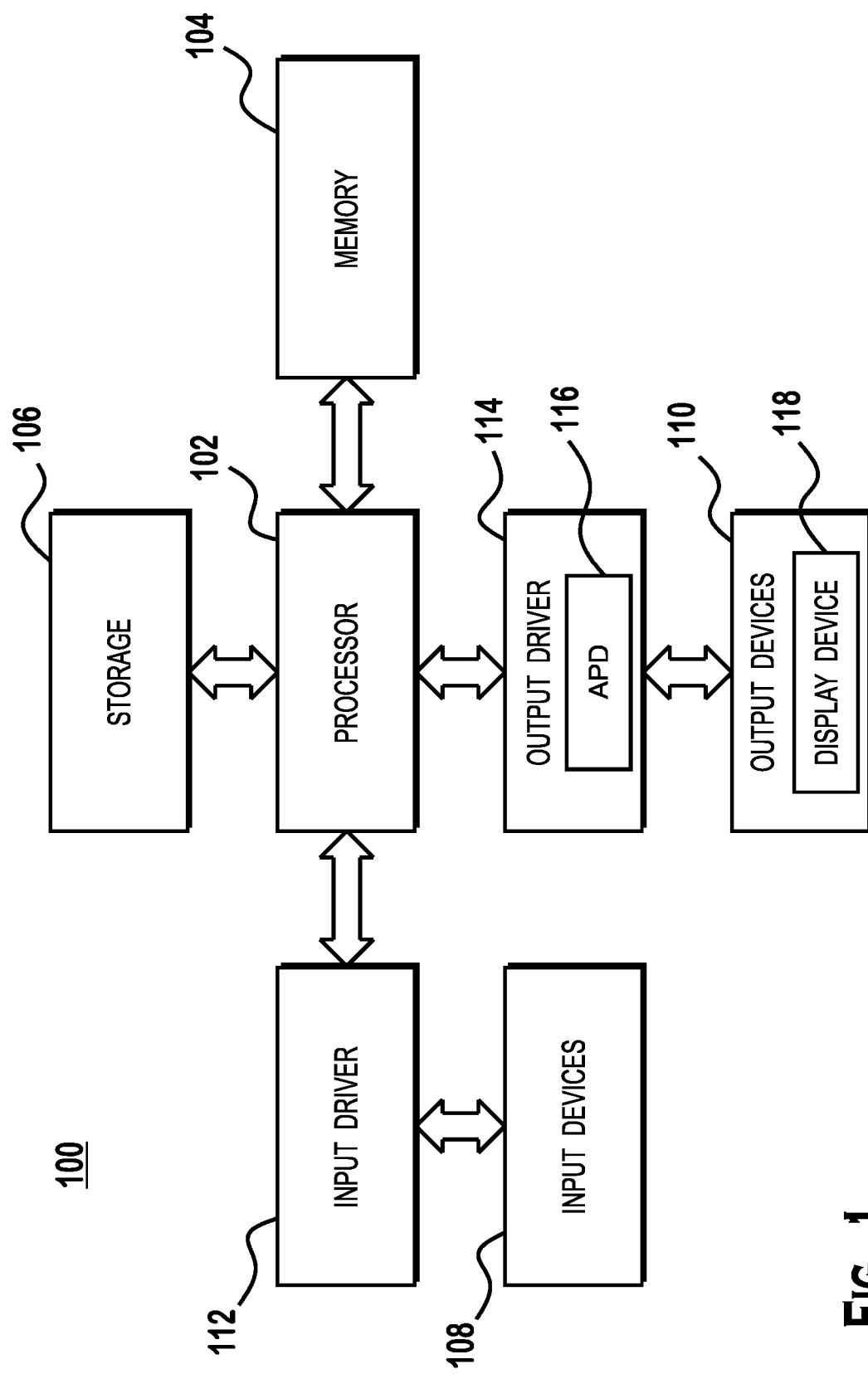
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
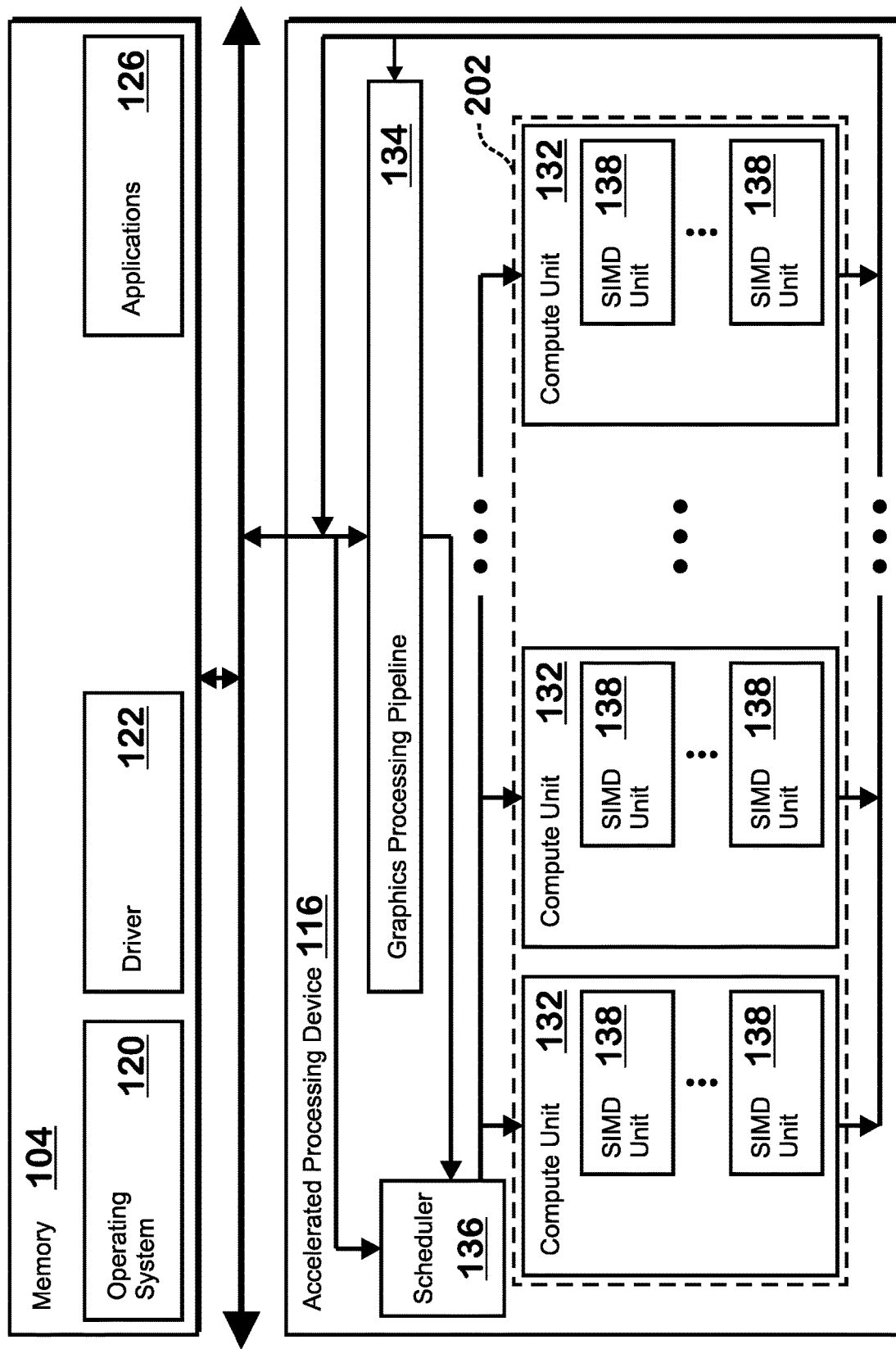
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
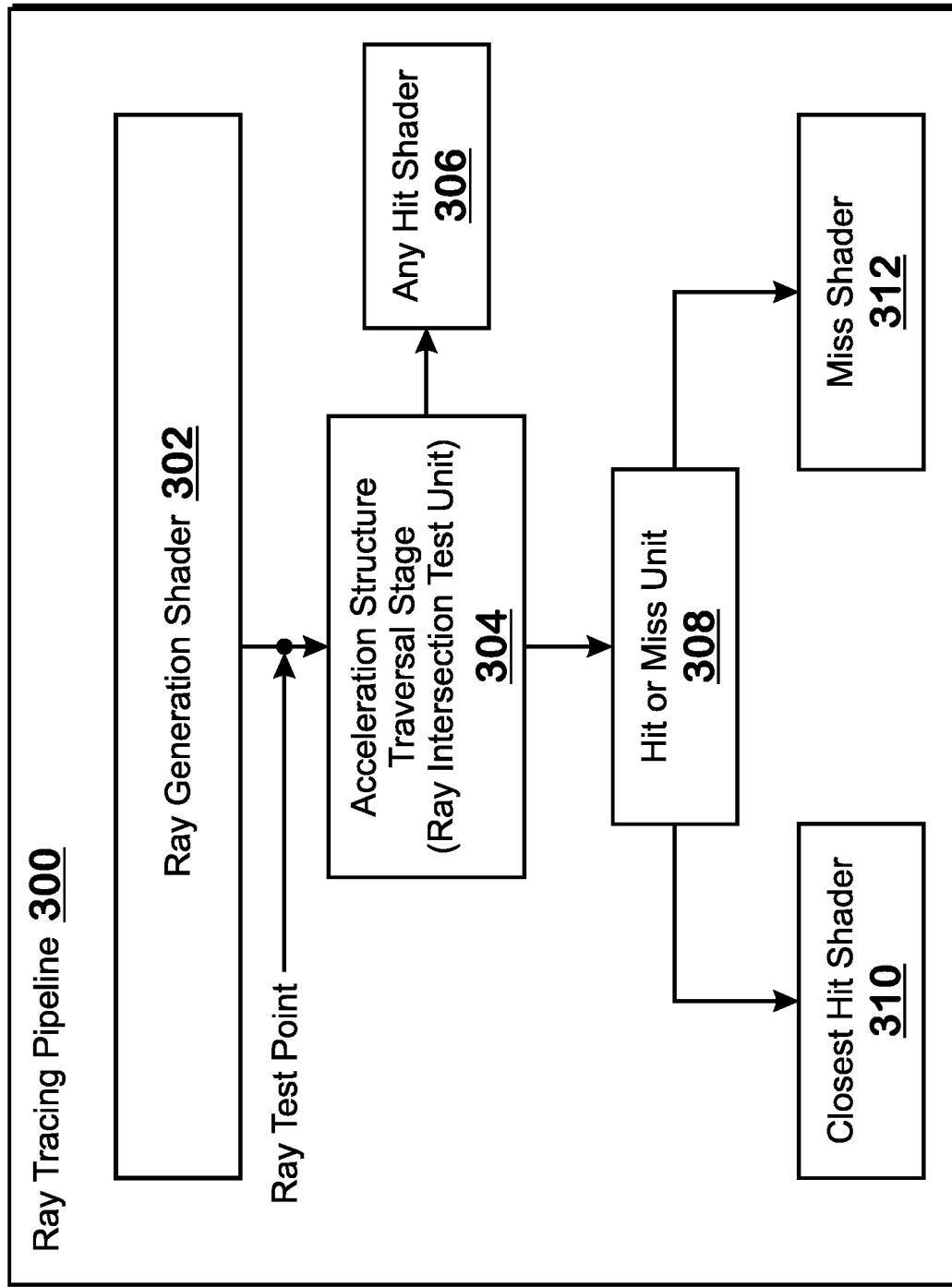
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator such as a program executing on the processor 102 designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image, and requesting rays be traced from the camera through the image. The ray tracing pipeline 300 performs the various operations described herein to determine colors for the rays. Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is performed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers performance of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers performance of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle (or other geometry) against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
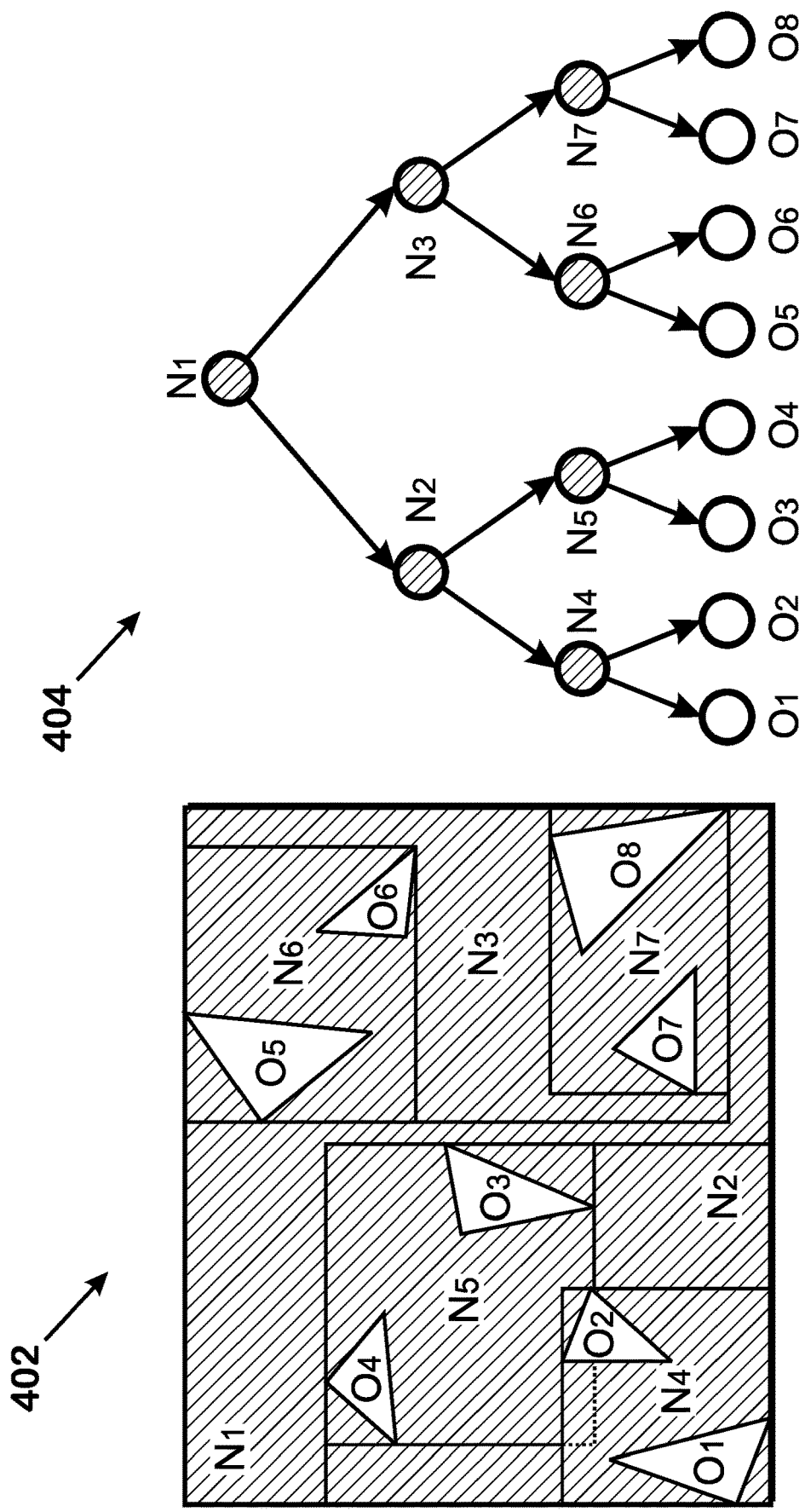
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray-triangle test involves asking whether the ray hits the triangle and also the time to hit the triangle (time from ray origin to point of intersection). Conceptually, the ray-triangle test involves projecting the triangle into the viewspace of the ray so that it is possible to perform a simpler test similar to testing for coverage in two dimensional rasterization of a triangle as is commonly performed in graphics processing pipelines. More specifically, projecting the triangle into the viewspace of the ray transforms the coordinate system so that the ray points downwards in the z direction and the x and y components of the ray are 0 (although in some modifications, the ray may point upwards in the z direction, or in the positive or negative x or y directions, with the components in the other two axes being zero). The vertices of the triangle are transformed into this coordinate system as well. Such a transform allows the test for intersection to be made by simply asking whether the x, y coordinates of the ray fall within the triangle defined by the x, y coordinates of the vertices of the triangle, which is the rasterization operation described above. In effect, a 3D query is converted into a simpler two-dimensional query, which is shown in FIG. 6.

Figure 5:
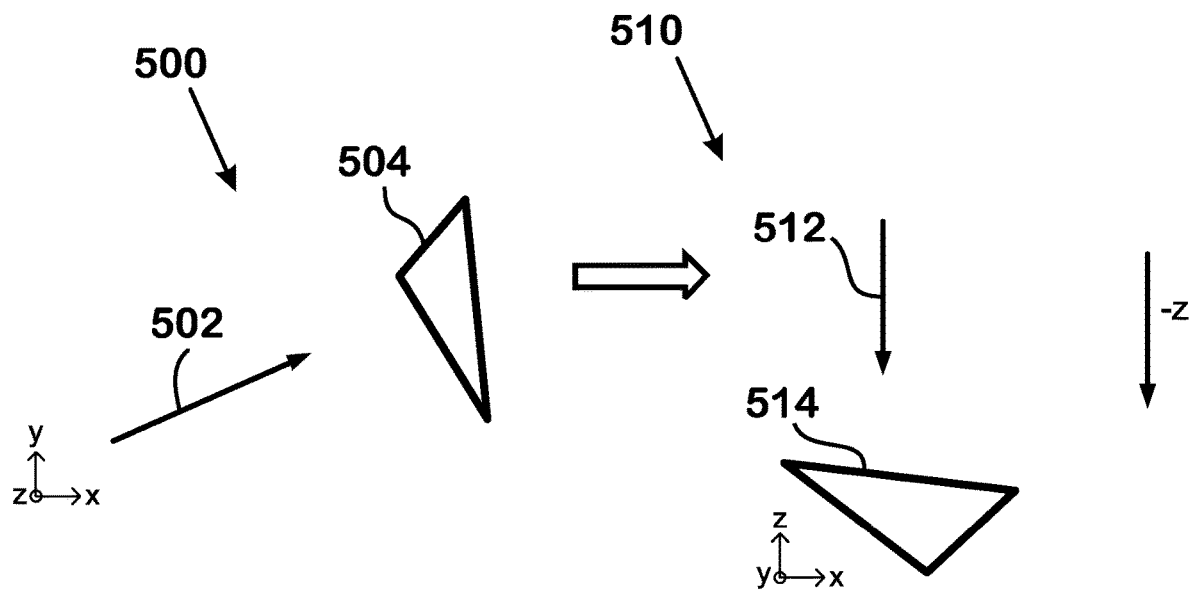
FIG. 5 illustrates a coordinate transform for performing a ray-triangle intersection test, according to an example.

The above transformation is illustrated in FIG. 5. The ray 502 and triangle 504 are shown in coordinate system 500 before the transformation. In the transformed coordinate system 510 coordinate system, the ray 512 is shown pointing in the −z direction and the triangle 514 is shown in that coordinate system 510 as well.

Figure 6:
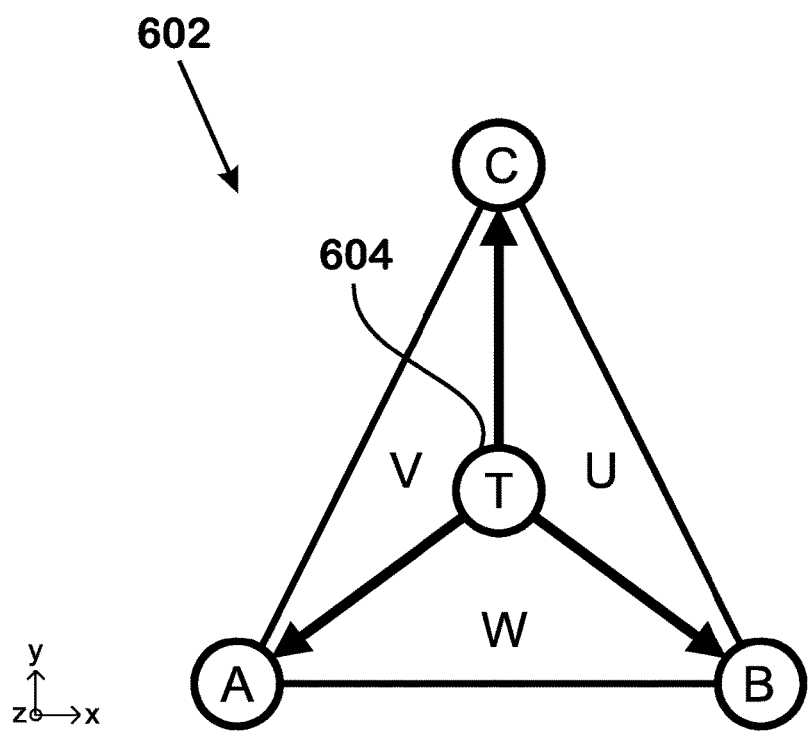
FIG. 6 illustrates the ray-triangle intersection test as a rasterization operation, according to an example.

FIG. 6 illustrates the ray intersection test as a rasterization operation. Specifically, vertices A, B, and C define the triangle 514 and vertex T is the origin of the ray 512. Testing for whether the ray 512 intersects the triangle 514 is performed by testing whether vertex T is within triangle ABC. This operation is referred to as a "rasterization" operation because in rasterization, the question is which pixels fall within a triangle. This will be described in further detail below.

Additional details of the ray-triangle test are now provided. First, the coordinate system is rotated so that the z-axis is the dominant axis of the ray (where "dominant axis" means the axis that the ray travels the quickest in). This rotation is done to avoid some edge cases when the z component of the ray direction is 0 and the poorer numerical stability that occurs when the z component of the ray direction is small. The coordinate system rotation is performed in the following manner. Note that this coordinate system rotation is optional.

First, note the ray is defined by both an origin and a direction. The origin is the starting point of the ray and the direction indicates the directional extent of the ray. The largest dimension (x, y, or z) of the ray is determined. The largest dimension is the dimension whose magnitude is the largest. More specifically, the ray has three components: x, y, and z, which define of the ray. The largest of the absolute values of these components is considered to be the largest dimension.

With the largest dimension determined, the ray is rotated so that the largest dimension of the ray is pointing in the z direction. If the largest dimension is z, then the ray does not change. If the largest dimension is x, then the ray is rotated by setting the x dimension to the old y dimension, the y dimension to the old z dimension, and the z dimension to the old x dimension. If the largest dimension is y, then the ray is rotated by setting the x dimension to the old z dimension, the y dimension to the old x dimension, and the z dimension to the old y dimension. Because a ray is defined by both origin and direction, the origin is rotated in a similar manner as with the direction vector. In addition, the vertices of the triangle (shown as A, B, and C in FIG. 6) are rotated in the same way that the vertices of the ray are rotated.

In the next step, the vertices of the triangle are translated to be relative to the origin of the ray. More specifically, a translated A vertex is determined by subtracting the ray origin from the old A vertex. A translated B vertex is determined by subtracting the ray origin from the old B vertex. A translated C vertex is determined by subtracting the ray origin from the old C vertex. The translated A, B, and C vertices are referred to herein as $A_{tr}$, $B_{tr}$, and $C_{tr}$, respectively. The ray origin is now set to <0,0,0>. It should be understood that the ray direction is relative to the ray origin.

Next, to simplify the calculation of the intersection between the ray and the triangle, a linear transformation is applied to the ray and the vertices of the triangle to allow the test to be performed in two dimensions rather than three. This linear transformation is done by multiplying each of the vertices of the triangle by the transformation matrix M. The ray direction does not need to be explicitly transformed by matrix M because matrix M is constructed such that the transformed ray direction will always be <0, 0, ray_dir.z>. The ray direction can be transformed like this because the ray origin is at <0,0,0> due to the above translation step. Note, ray_dir.z is the z component of the rotated ray direction, ray_dir.x is the x component of the rotated ray direction, and ray_dir.y is the y component of the rotated ray direction. The ray origin does not need to be transformed because the ray origin is <0,0,0>. Matrix M is the following:

$$M = \begin{bmatrix} \text{ray\_dir}.z & 0.0 & -\text{ray\_dir}.x \\ 0.0 & \text{ray\_dir}.z & -\text{ray\_dir}.y \\ 0.0 & 0.0 & 1.0 \end{bmatrix}$$

The matrix multiplication occurs by multiplying the translated vertices of triangle ($A_{tr}$, $B_{tr}$, and $C_{tr}$) by the matrix M, to generate new vertices for the triangle $A_{trf}$, $B_{trf}$, and $C_{trf}$, as follows. Note, components of a particular vertex are indicated with the subscript suffix -x, -y, or -z.

$$A_{trf-x} = A_{tr-x} * \text{ray\_dir}.z - \text{ray\_dir}.x * A_{tr-z}$$

$$A_{trf-y} = A_{tr-y} * \text{ray\_dir}.z - \text{ray\_dir}.y * A_{tr-z}$$

$$A_{trf-z} = A_{tr-z}$$

$$B_{trf-x} = B_{tr-x} * \text{ray\_dir}.z - \text{ray\_dir}.x * B_{tr-z}$$

$$B_{trf-y} = B_{tr-y} * \text{ray\_dir}.z - \text{ray\_dir}.y * B_{tr-z}$$

$$B_{trf-z} = B_{tr-z}$$

$$C_{trf-x} = C_{tr-x} * \text{ray\_dir}.z - \text{ray\_dir}.x * C_{tr-z}$$

$$C_{trf-y} = C_{tr-y} * \text{ray\_dir}.z - \text{ray\_dir}.y * C_{tr-z}$$

$$C_{trf-z} = C_{tr-z}$$

Conceptually, the matrix M scales and shears the coordinates such that the ray direction only has a z component of magnitude ray_dir.z. The x and y components of the ray direction have magnitude 0. With the vertices transformed in the above manner, the ray-triangle test is performed as the 2D rasterization test—that is, whether the origin point T is within the triangle ABC. FIG. 6 illustrates a triangle 602 having vertices A, B, and C, corresponding to the $A_{trf}$, $B_{trf}$, and $C_{trf}$ described above. The ray 604 is shown as point T. Because of the transformations performed on the vertices and the ray, the ray is pointing in the −z direction. In addition, because the triangle is projected onto the coordinate system in which the ray points in the −z direction, the triangle-ray test is reformulated as a test for whether the origin of the ray is within the triangle defined by the x, y coordinates of the vertices A, B, and C. In other words, the 3-dimensional test of whether the ray intersects the triangle has been converted into a 2-dimensional test of whether the origin of the ray is within a triangle. In addition, because of the above transformations: the ray origin is at 2D point (0,0); the point of intersection between the ray and the triangle (T) is also at 2D point (0,0); and the distances between the vertices of the triangle, which are A-T for vertex A, B-T for vertex B, and C-T for vertex C, are simply A, B, and C because the point of intersection between the ray and the triangle is at (0,0).

Next, barycentric coordinates for the triangle, U, V, W (shown in FIG. 6) are calculated in the following manner:

$$U = \text{area}(\text{Triangle } CBT) = 0.5 * (C \times B)$$

$$V = \text{area}(\text{Triangle } ACT) = 0.5 * (A \times C)$$

$$W = \text{area}(\text{Triangle } BAT) = 0.5 * (B \times A)$$

Here, the "x" indicates a cross-product and A, B, and C are the transformed vertices $A_{trf}$, $B_{trf}$, and $C_{trf}$, which are shown in FIG. 6. The signs of U, V, and W indicate whether the ray intersects the triangle. More specifically, if U, V, and W are all positive, or if U, V, and W are all negative, then the ray is considered to intersect the triangle because the point T is inside the triangle in FIG. 6. If the signs of U, V, and W are different, then the ray does not intersect the triangle because the point T is outside of the triangle. If exactly one of U, V, and W is zero, then the point T lies on the line that runs through the edge corresponding to that coordinate. In this situation, the point T is on an edge of the triangle 602 if the signs of the other two coordinates are the same, but if the signs of the other two coordinates are different, then the point is not on an edge of the triangle. If exactly two of U, V, and W are zero, then the point T is considered to be on a corner of the triangle. If all of U, V, and W are zero, then the triangle is a zero area triangle. One additional point is that point T may be inside the triangle in 2D (indicated as the ray intersecting the triangle above) but may still miss the triangle in 3D space if the ray is behind the triangle. The sign of t, described below, indicates whether the ray is behind (and thus does not intersect) the triangle. Specifically, if the sign is negative, the ray is behind the triangle and does not intersect the triangle. If the sign is positive or 0, then the ray intersects the triangle.

In various implementations, any of the situations where the point is on an edge or a corner, or in the situation where the triangle is a zero area triangle, may be considered either a hit or a miss. In other words, the determination of whether the point lying on an edge is a hit or a miss, and/or the determination of whether the point lying on a corner is a hit or a miss, is dependent on a specific policy. For example, in some implementations, all instances where the point lies on an edge or a corner are considered to be hits. In other implementations, all such instances are considered to be misses. In yet other implementations, some such instances (such as the point T lying on edges facing in specific directions) are considered hits while other such instances are considered misses.

In addition, the time t at which the ray hits the triangle is determined. This is done using the barycentric coordinates of the triangle (U, V, and W) already calculated, by interpolating the Z value of all of the triangle vertices. First, the z component of point T (the intersection point of the ray with the triangle) is calculated:

$$T.z = \frac{U * Az + V * Bz + W * Cz}{U + V + W}$$

where Az is the z component of vector A, Bz is the z component of vector B, Cz is the z component of vector C, and U, V, and W are the barycentric coordinates calculated above. (A, B, and C are the same as $A_{trf}$, $B_{trf}$, and $C_{trf}$ above). T.x and T.y are zero, and thus T is (0, 0, T.z). The time t is calculated as follows:

$$t = \frac{\text{distance (ray\_origin, } T)}{\text{length (ray\_dir)}} = \frac{\text{length } (T)}{\text{length (ray\_dir)}} = \frac{T.z}{\text{ray\_dir}.z}$$

where distance( ) represents the distance between two points, length( ) represents the length of a vector. The final expression for time of intersection t is as follows:

$$t = \frac{U * Az + V * Bz + W * Cz}{(U + V + W) * \text{ray\_dir}.z}$$

Note that although the above-described steps are performed such that the ray points in a −z direction, this direction is arbitrary and the steps are of course symmetric with respect to any particular direction for ray pointing.

Figure 7:
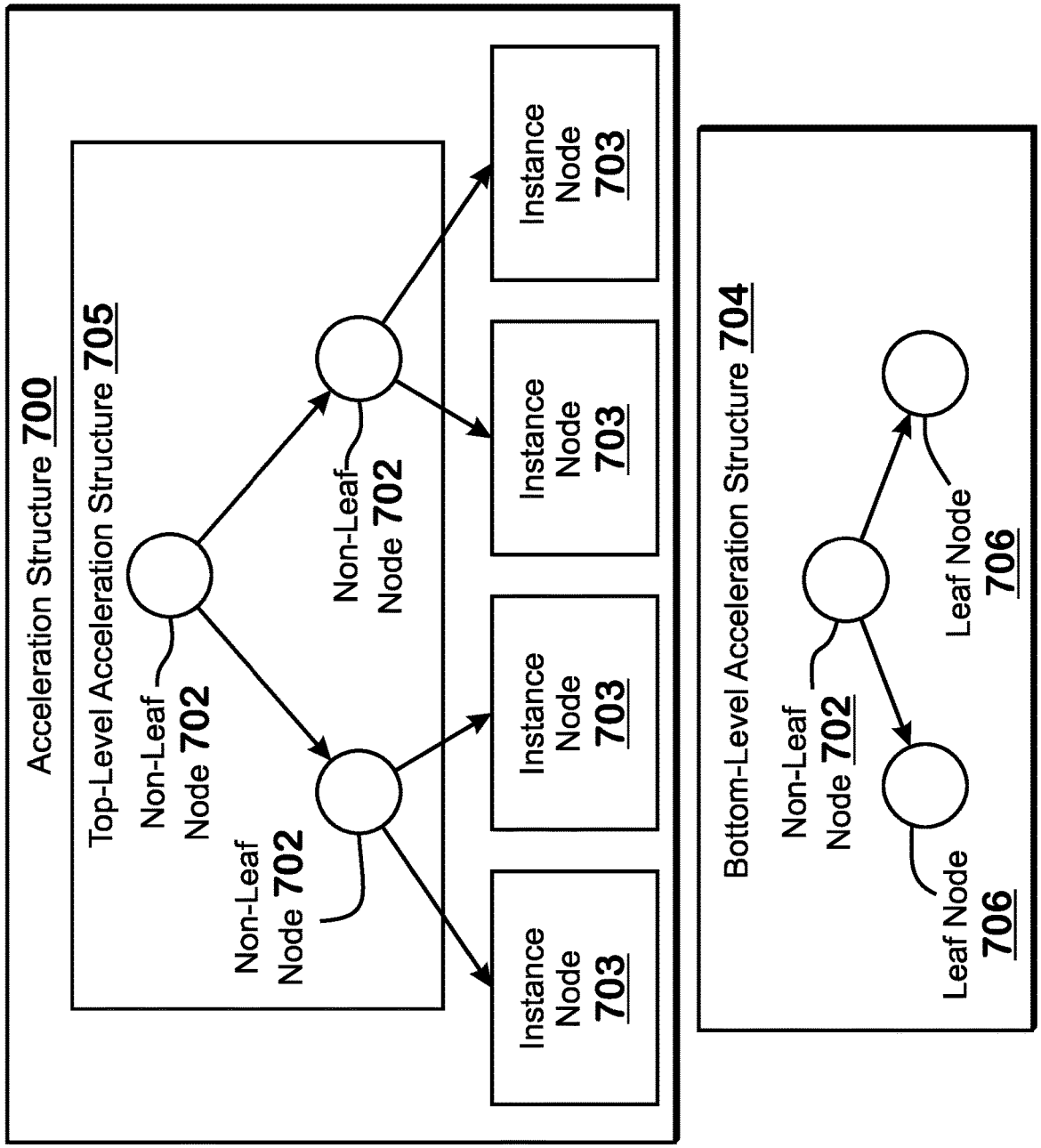
FIG. 7 illustrates an example two-level acceleration structure.

FIG. 7 illustrates an example two-level acceleration structure 700. The example acceleration structure 700 serves the same purpose as the bounding volume hierarchy 404 of FIG. 4. More specifically, the acceleration structure 700 includes non-leaf nodes 702 and leaf nodes (within the bottom-level acceleration structures 704). The ray tracing pipeline 300 performs a ray intersection test by traversing the acceleration structure 700. Specifically, the ray tracing pipeline 300 tests the ray against the bounding boxes associated with the non-leaf nodes 702, eliminating descendants of such nodes if the intersection test fails. For leaf nodes 706, the ray tracing pipeline 300 uses the results of the intersection with such leaf nodes to determine whether the ray hits or misses associated geometry. In an example, if the ray intersects with the geometry associated with a leaf node, then the ray is deemed to hit that leaf node and if the ray does not intersect with the geometry associated with a leaf node, then the ray is deemed to miss that leaf node.

The acceleration structure 700 is a two-level acceleration structure that includes a top-level acceleration structure 705 and one or more bottom-level acceleration structure 704. The top-level acceleration structure 705 includes non-leaf nodes 502 and instance nodes 703. Some of the non-leaf nodes 502 include pointers to instance nodes 703. The instance nodes 703 include pointers to bottom-level acceleration structures 704. In some implementations, the top-level acceleration structure 705 also includes leaf nodes (similar to the leaf nodes 706 of the bottom-level acceleration structures 704). The bottom-level acceleration structures 704 include leaf nodes 706. Some bottom-level acceleration structures 704 include non-leaf nodes 702 that include pointers to non-leaf nodes 702 or leaf nodes 706.

As stated above, the acceleration structure 700 is a two-level acceleration structure. Thus the acceleration structure 700 includes a top-level acceleration structure 705 and one or more bottom-level acceleration structures 704. One benefit of a two-level acceleration structure is that portions of the acceleration structure can be instanced. Specifically, it is possible for the acceleration structure 700 to behave as if multiple copies or "instances" of a single bottom-level acceleration structure 704 existed. More specifically, it is possible for different instance nodes 703 to point to the same bottom-level acceleration structure 704. The instancing provides the benefit that a smaller amount of data is required as compared with an acceleration structure in which instancing does not occur. In addition to including pointers to bottom-level acceleration structure 704, instance nodes 703 also include information that specifies rotational and positional transforms, for placing and rotating the bottom-level acceleration structure 704 in world space.

A ray intersection test unit 304 traverses the acceleration structure 700 to test a ray against the associated geometry in the following manner. The ray intersection test unit 304 begins at a top node such as the top non-leaf node 702 of the top-level acceleration structure 705. The ray intersection test unit 304 tests the ray against the bounding box associated with that non-leaf node 702. In the event that the intersection fails, the ray intersection test unit 304 does not traverse to any of the children of that node, and in the event that the intersection test succeeds, the ray intersection test unit 304 does traverse to the children of that node. For a child that is traversed to, the ray intersection test unit 304 tests the ray against the geometry of that child (e.g., a bounding box), again, determining whether to traverse to the children of that child or not, based on the results of a test.

When the ray intersection test unit 304 arrives at an instance node 703, the ray intersection test unit 304 applies the transforms associated with the instance node 703 to the ray, and then traverses to the bottom-level acceleration structure 704 pointed to by that instance node 703. As described above, the instance nodes 703 specify transforms such as changes in position or orientation. These transforms, when applied to the ray, cause intersections with the ray to be evaluated as if the geometry (including non-leaf nodes 702 and leaf nodes 706) of the bottom-level acceleration structure 704 had a position and orientation defined by the transforms. These transforms thus allow the same data—a bottom-level acceleration structure 704—to represent geometry having different positions and orientations. Applying such transforms to the ray includes multiplying a matrix representing the transformations by the origin and the direction of the ray.

Figure 8:
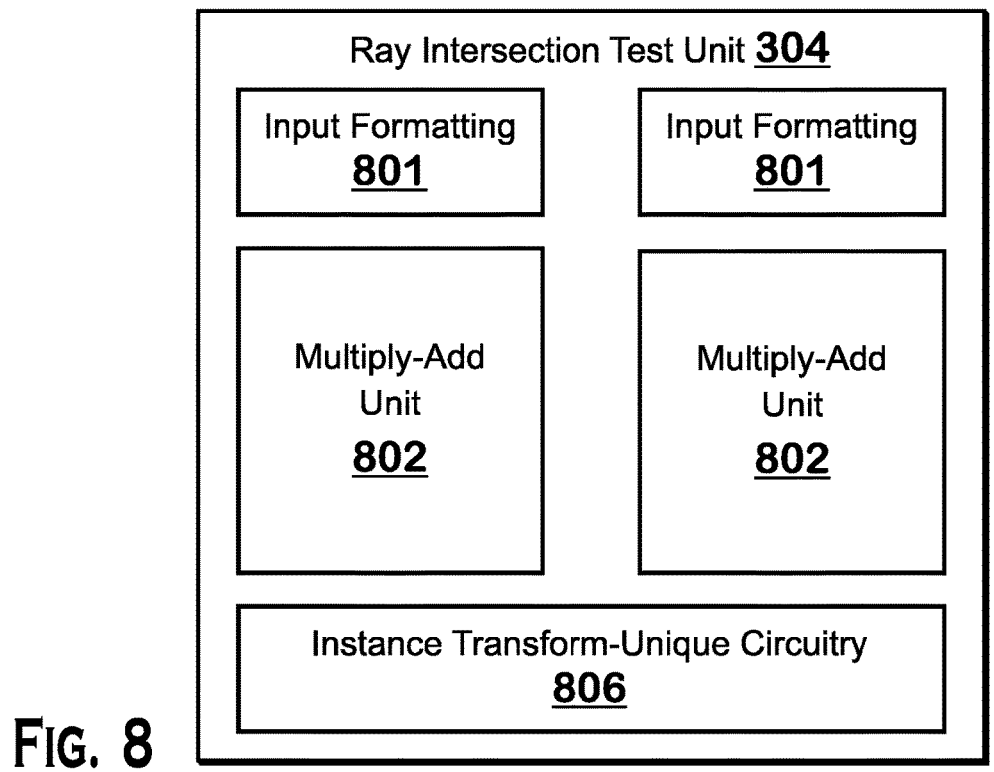
FIG. 8 illustrates an example ray intersection test unit that includes multiply-add units that are used for both the triangle intersection test and the instance transform operation.

FIG. 8 illustrates an example ray intersection test unit 304 that includes multiply-add units 802 that are used for both the triangle intersection test and the instance transform operation. The ray intersection test unit 304 includes one or more input formatting units 801, one or more multiply-add units 802, and one or more instance transform-unique circuitry 806.

Part of the triangle intersection test is implemented with multiply-add operations, and part of the instance transform (multiplying the origin and direction of a ray) is implemented with multiply-add operations. It is possible to use the same circuitry to perform these different multiply-add operations. In addition, the input formatting 801 can be used for both operations.

The triangle intersection test involves the following operations: subtraction, from the vertices of the triangle (A, B, and C), the ray origin, to obtain transformed triangle vertices $A_{tr}$, $B_{tr}$, and $C_{tr}$. Subsequently, the triangle vertices are multiplied by the triangle transformation matrix M. For x and y components of the triangle vertices, this multiplication is shown above as:

$$A_{trf\text{-}x} = A_{tr\text{-}x} * \text{ray\_dir}.z - \text{ray\_dir}.x * A_{tr\text{-}z}$$

$$A_{trf\text{-}y} = A_{tr\text{-}y} * \text{ray\_dir}.z - \text{ray\_dir}.y * A_{tr\text{-}z}$$

$$B_{trf\text{-}x} = B_{tr\text{-}x} * \text{ray\_dir}.z - \text{ray\_dir}.x * B_{tr\text{-}z}$$

$$B_{trf\text{-}y} = B_{tr\text{-}y} * \text{ray\_dir}.z - \text{ray\_dir}.y * B_{tr\text{-}z}$$

$$C_{trf\text{-}x} = C_{tr\text{-}x} * \text{ray\_dir}.z - \text{ray\_dir}.x * C_{tr\text{-}z}$$

$$C_{trf\text{-}y} = C_{tr\text{-}y} * \text{ray\_dir}.z - \text{ray\_dir}.y * C_{tr\text{-}z}$$

For the instance transformation operation, the ray origin and ray direction are multiplied by a 4×3 instance transformation matrix $M_{tr}$. For the ray direction, this math can be expressed as:

$$\begin{bmatrix} M0.x & M0.y & M0.z & M0.w \\ M1.x & M1.y & M1.z & M1.w \\ M2.x & M2.y & M2.z & M2.w \end{bmatrix} \times \begin{bmatrix} Rd.x \\ Rd.y \\ Rd.z \\ 0 \end{bmatrix}$$

The left side is the transformation matrix and the right side is the ray direction. For the ray origin, the math can be expressed as:

$$\begin{bmatrix} M0.x & M0.y & M0.z & M0.w \\ M1.x & M1.y & M1.z & M1.w \\ M2.x & M2.y & M2.z & M2.w \end{bmatrix} \times \begin{bmatrix} Ro.x \\ Ro.y \\ Ro.z \\ 1 \end{bmatrix}$$

where, again, the left side is the transformation matrix and the right side is the ray origin.

In common form, the multiplication can be represented as:

$$\begin{bmatrix} M0.x & M0.y & M0.z & M0.w \\ M1.x & M1.y & M1.z & M1.w \\ M2.x & M2.y & M2.z & M2.w \end{bmatrix} \times \begin{bmatrix} R.x \\ R.y \\ R.z \\ R.w \end{bmatrix}$$

Where R is either the ray origin or the ray direction. If the array is re-expressed as:

$D0=M0.xyzw$ $D1=M1.xyzw$ $D2=M2.xyzw$ then the matrix multiplication can be expressed in multiply-add operations:

$Ax=D0.x*R.x+D0.y*R.y$ $Bx=D1.x*R.x+D1.y*R.y$ $Cx=D2.x*R.x+D2.y*R.y$ $Ay=D0.z*R.z+D0.w*R.w$ $By=D1.z*R.z+D1.w*R.w$ $Cy=D2.z*R.z+D2.w*R.w$ where the x and y components of A, B, and C are partial sums of the matrix product result. The result would thus be $R.x=Ax+Ay$ $R.y=Bx+By$ $R.z=Cx+Cy$ For the transformation matrix, the multiply-add units 802 perform the matrix multiplication above and the input formatting unit 801 sets the values of R, D0, D1, and D2.

For the triangle intersection test, the input formatting unit 801 sets the following values:

$R0=(\text{ray\_origin},0)$ $R=(\text{ray\_dir}.x,\text{ray\_dir}.y,\text{ray\_dir}.z,\text{ray\_dir}.z)$ $v0\_rel=v0-R0$ $v1\_rel=v1-R0$ $v2\_rel=v2-R0$ $D0=(v0\_rel.x,-v0\_rel.z,v0\_rel.y,-v0\_rel.z)$ $D1=(v1\_rel.x,-v1\_rel.z,v1\_rel.y,-v1\_rel.z)$ $D2=(v2\_rel.x,-v2\_rel.z,v2\_rel.y,-v2\_rel.z)$ where v0 is the first vertex of the triangle, v1 is the second vertex of the triangle, and v2 is the third vertex of the triangle.

The matrix multiplication is then expressed as:

$Ax=D0.x*R.x+D0.y*R.y$ $Bx=D1.x*R.x+D1.y*R.y$ $Cx=D2.x*R.x+D2.y*R.y$ $Ay=D0.z*R.z+D0.w*R.w$ $By=D1.z*R.z+D1.w*R.w$ $Cy=D2.z*R.z+D2.w*R.w$

Here, x and y values represent x and y components of the transformed A, B, and C vertices of the triangle. As described above, the Z components are not modified by the transformation and therefore do not need to be processed by the multiply-add unit 802. The matrix multiplication is performed by the multiply-add unit 802, and the operations for setting R0, R, v0_rel, v1_rel, v2_rel, D0, D1, and D2 are performed by the input formatting unit 801.

It can be seen that the matrix multiplication for the triangle operation and the instance transform operation has the same form—the sum of two products. This similarity allows the same hardware to be used for both operations. The input formatting block 801 makes the transformation for the triangle have the same form as for the instance transform, converting a subtractive operation into an additive one. Further, although the multiply-add unit 802 generates partial matrix products for the instance transform, these partial products are summed in the instance transform-unique circuitry 806. The input formatting circuitry 801 also includes some functionality in that the first three components of the vector R are set to the x, y, and z components of the ray direction or ray origin. In sum, by manipulating the manner in which inputs are provided to the multiply-add unit 802, the same multiply-add unit 802 can be used for both ray-triangle intersection testing and instance transform operations. Because multiply-add circuits are much more complex than some other types of circuitry such as adders, reusing these multiply-add units 802 for different operations reduces the amount of circuitry required as compared with a configuration in which separate multiply-adders were included for the triangle transform and the instance transform operations.

The ray intersection test unit 304 illustrates two input formatting units 801 and two multiply-add units 802 so that two triangle tests can be performed at the same time, or an instance transform can be performed on the ray origin and ray direction at the same time. However, in alternative implementations, the ray intersection test unit 304 includes any technically feasible number of such units.

Figure 9:
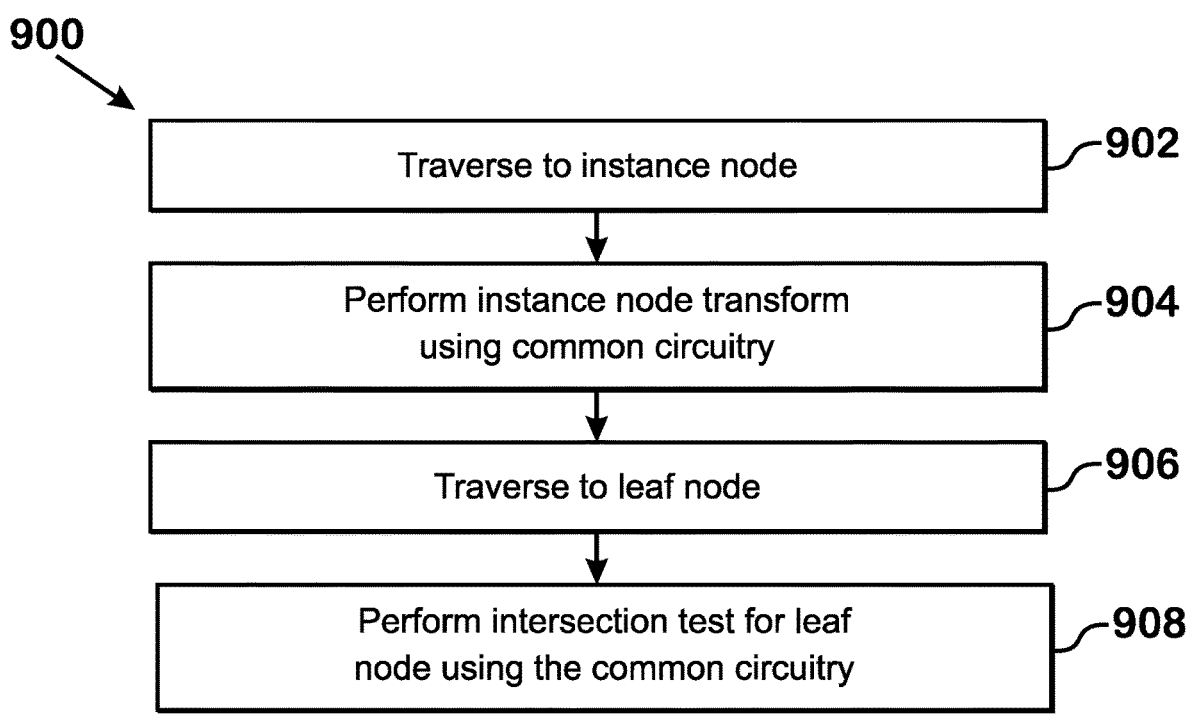
FIG. 9 is a flow diagram of a method for performing ray tracing operations, according to an example.

FIG. 9 is a flow diagram of a method 900 for performing ray tracing operations, according to an example. Although described with respect to the system of FIG. 1-8, those of skill in the art will recognize that any system, configured to perform the steps of the method 900 in any technically feasible order, falls within the scope of the present disclosure.

At step 902, a ray tracing pipeline 300 traverses to an instance node 703. As described elsewhere herein, an instance node 703 is a node within an acceleration structure that points to a bottom-level acceleration structure 704. The instance node 703 includes transformation information that indicates how to transform a ray for testing against the contents of the bottom-level acceleration structure 704. At step 904, the ray tracing pipeline 300 performs an instance node transform using common circuitry. As described elsewhere herein, the instance node transform modifies the position and/or orientation of the ray origin and direction, which prepares the ray for traversal of the bottom-level acceleration structure 704. Step 904 is performed using common circuitry, which includes the multiply-add unit 802 of the ray intersection test unit 304, which is also used for triangle intersection testing.

At step 906, the ray tracing pipeline 300 traverses to a leaf node 706 of the acceleration structure 700. As described elsewhere herein, these leaf nodes 706 include geometry description such as triangle descriptions. At step 908, the ray tracing pipeline 300 performs a ray triangle intersection test using the common circuitry. The ray triangle intersection includes multiplication of a transformation matrix by vertices of the triangle to obtain transformed vertices of the triangle. The multiply-add units 802 used for this multiplication are the same as those used for the instance transformation.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor. The input formatting unit 801, multiply-add unit 802, and instance transform-unique circuitry 806 are implemented as hard wired circuitry.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   traversing through a bounding volume hierarchy to an instance node;
   performing an instance node transform using common circuitry and unique circuitry unique to instance node transform operations, wherein the common circuitry does not include the unique circuitry, wherein the instance node transform operations include multiply-add operations to generate partial sums performed by the common circuitry and summing of the partial sums by the unique circuitry;
   traversing to a leaf node of the bounding volume hierarchy; and
   performing a triangle intersection test for the leaf node using the common circuitry and not the unique circuitry, wherein the common circuitry performs multiply-add operations for the triangle intersection test.

2. The method of claim 1, wherein the instance node includes a pointer to a bottom-level acceleration structure.

3. The method of claim 1, wherein the instance node includes position and orientation transformation information.

4. The method of claim 1, wherein the instance node transform includes a first matrix multiplication and the triangle intersection test includes a second matrix multiplication.

5. The method of claim 4, wherein the first matrix multiplication includes multiplying an instance transformation matrix by a ray origin and a ray direction.

6. The method of claim 4, wherein the second matrix multiplication includes multiplying a transformation matrix by a ray direction.

7. The method of claim 1, wherein the leaf node specifies geometry for a triangle.

8. The method of claim 1, wherein the triangle intersection test includes transforming a ray into a coordinate system in which an origin of the ray has x and y components of 0.

9. A system for performing ray tracing operations, the system comprising:
   a processor; and
   a ray intersection test circuit configured to:
     traverse through a bounding volume hierarchy to an instance node;
     perform an instance node transform using common circuitry and unique circuitry unique to instance node transform operations, wherein the common circuitry does not include the unique circuitry, wherein the instance node transform operations include multiply-add operations to generate partial sums performed by the common circuitry and summing of the partial sums performed by the unique circuitry;

traverse to a leaf node of the bounding volume hierarchy; and perform a triangle intersection test for the leaf node using the common circuitry and not the unique circuitry, wherein the common circuitry performs multiply-add operations for the triangle intersection test.

10. The system of claim 9, wherein the instance node includes a pointer to a bottom-level acceleration structure.

11. The system of claim 9, wherein the instance node includes position and orientation transformation information.

12. The system of claim 9, wherein the instance node transform includes a first matrix multiplication and the triangle intersection test includes a second matrix multiplication.

13. The system of claim 12, wherein the first matrix multiplication includes multiplying an instance transformation matrix by a ray origin and a ray direction.

14. The system of claim 12, wherein the second matrix multiplication includes multiplying a transformation matrix by a ray direction.

15. The system of claim 9, wherein the leaf node specifies geometry for a triangle.

16. The system of claim 9, wherein the triangle intersection test includes transforming a ray into a coordinate system in which an origin of the ray has x and y components of 0.

17. A system, comprising:

a ray tracing pipeline configured to request a triangle intersection test be performed by a ray intersection test circuit; and the ray intersection test circuit, configured to:

traverse through a bounding volume hierarchy to an instance node;

perform an instance node transform using common circuitry and unique circuitry unique to instance node transform operations, wherein the common circuitry does not include the unique circuitry, wherein the instance node transform operations include multiply-add operations to generate partial sums performed by the common circuitry and summing of the partial sums performed by the unique circuitry;

traverse to a leaf node of the bounding volume hierarchy; and perform the triangle intersection test for the leaf node using the common circuitry and not the unique circuitry, wherein the common circuitry performs multiply-add operations for the triangle intersection test.

18. The system of claim 17, wherein the instance node includes a pointer to a bottom-level acceleration structure.

19. The system of claim 17, wherein the instance node transform includes a first matrix multiplication and the triangle intersection test includes a second matrix multiplication.

20. The system of claim 19, wherein the first matrix multiplication includes multiplying an instance transformation matrix by a ray origin and a ray direction.

* * * * *